(12) United States Patent
Cordelet et al.

(10) Patent No.: US 6,296,816 B1
(45) Date of Patent: Oct. 2, 2001

(54) PROCESS FOR TREATING AN AQUEOUS SOLUTION OF TITANYLE SULFATE

(75) Inventors: Frederic Cordelet, Dompierre sur Mer; Fabrice Fourcot, Velizy Villacoublay, both of (FR)

(73) Assignee: Millennium Inorganic Chemicals, S.A., Thann (FR)

( * ) Notice: Subject to any disclaimer, the term of this patent is extended or adjusted under 35 U.S.C. 154(b) by 0 days.

(21) Appl. No.: 09/101,084

(22) PCT Filed: Dec. 20, 1996

(86) PCT No.: PCT/FR96/02038

§ 371 Date: Jan. 5, 1999

§ 102(e) Date: Jan. 5, 1999

(87) PCT Pub. No.: WO97/24287

PCT Pub. Date: Jul. 10, 1997

(30) Foreign Application Priority Data

Dec. 29, 1995 (FR) .................................................. 95/15714

(51) Int. Cl.⁷ ............................. C01G 23/00; C22B 34/12
(52) U.S. Cl. ................................................................ 423/70
(58) Field of Search .................................................. 423/70

(56) References Cited

U.S. PATENT DOCUMENTS

| | | | |
|---|---|---|---|
| 4,499,058 | * 2/1985 | Fetoussi | ................................. 423/70 |
| 4,986,742 | * 1/1991 | Denecker | ................................. 423/70 |
| 5,682,593 | * 10/1997 | Holzner | ................................... 423/70 |

* cited by examiner

*Primary Examiner*—Steven P. Griffin
*Assistant Examiner*—Maribel Medina
(74) *Attorney, Agent, or Firm*—Kalow & Springut LLP

(57) ABSTRACT

The invention concerns a treatment process with a starting aqueous phase (SAP) containing titanium and sulfuric acid produced by the attack of sulfuric acid on titaniferous ores of the type in which the following steps are used:

an extraction step in which the starting aqueous phase is placed in contact with an organic extraction phase (OEP) containing one or a plurality of organophosphorus compounds, by means of which an organic phase containing titanium and sulfuric acid (OP) is obtained;

then, a regeneration step in which the organic phase containing titanium and sulfuric acid (OP) is regenerated by contact with an aqueous regeneration phase ($ARP_0$), by means of which a regenerated aqueous phase ($RAP_f$) containing titanium is obtained;

characterized in that it includes in additional step in which all or part of the regenerated aqueous phase ($RAP_f$) is placed in contact with an organic washing phase (OWP), by means of which a treated aqueous phase (TAP) containing titanium is obtained.

21 Claims, 3 Drawing Sheets

PROCESS FOR TREATING AN AQUEOUS SOLUTION OF TITANYLE SULFATE

BACKGROUND OF THE INVENTION

The present invention concerns a process for treating an aqueous solution of titanium sulfate and generally fits into the process for preparing titanium dioxide by the sulfuric method.

The process for preparing titanium dioxide by the sulfuric method consists of treating ilmenite and/or titaniferous slags with concentrated sulfuric acid to obtain a titanium sulfate solution, called black liquor, which is then purified by eliminating the impurities, then hydrolyzed to obtain titanium dioxide.

One of the methods of purifying black liquor is to place the black liquor in contact with an organophosphorus solvent in the presence of acid to selectively extract the titanium sulfate inorganic phase and to thereby separate the impurities from it. The titanium sulfate present in the organic phase is then regenerated into aqueous phase by placement in contact with an aqueous phase.

An aqueous solution of purified titanium sulfate is obtained through this liquid-liquid extraction process. This solution may be hydrolyzed to prepare titanium dioxide. However, this hydrolysis may be conducted only under precise conditions, particularly as concerns the titanium and sulfuric acid contents of the solution to be hydrolyzed.

It is known that the acid factor, defined as the ratio of the concentration of the active acid (free $H_2SO_4$+acid linked to titanium in $TiOSO_4$ form), expressed in g/l of $H_2SO_4$, to the titanium, expressed in g/l of $TiO_2$, must present a low value, generally below 2.

The value of the acid factor of the final purified titanium sulfate solution may be controlled by adapting the various current flows utilized during the extraction and regeneration steps during purification. This control, however, must be precise, especially when the process for purification by extraction operates in a closed circuit, which is almost always the case.

Furthermore, under some flow conditions which permit the achievement of a good acid factor in the final solution, problems are observed in the extraction unit stages with precipitation of species containing titanium, such as ($TiOSO_4$, n $H_2O$), where n is between 0 and 2, at different degrees of hydration.

And finally, because of its precision, the control used does not allow the value of the acid factor of the final titanium sulfate solution to be modulated at will, thereby affecting the characteristics of the precipitated titanium dioxide.

Therefore, it is generally especially difficult to adjust the acid factor of a titanium sulfate solution during a sulfuric liquid-liquid extraction process, such that the final solution's acid factor is often too high and, if the solution is then hydrolyzed and the hydrolysate then washed and calcined, the pigment obtained is poor.

SUMMARY OF THE INVENTION

One object of the present invention is to resolve these disadvantages by offering a new purification process for a titanium sulfate aqueous solution that enables obtaining a low acid factor in the final titanium sulfate solution.

Another object is to offer a purification process for a titanium sulfate aqueous solution that makes it possible to control the acid factor by avoiding titanium sulfate precipitation problems in the battery extraction stages.

Another object is to offer a purification process for an aqueous titanium sulfate solution that makes it possible to freely modulate the value of the final acid factor.

To that end, the invention concerns an initial embodiment of a treatment process with a starting aqueous phase (SAP) containing titanium and sulfuric acid produced by the attack of sulfuric acid on titaniferous ores of the type in which the following steps are used:

an extraction step in which the starting aqueous phase (SAP) comes in contact with an organic extraction phase (OEP) containing one or a plurality of organophosphorus compounds, by means of which an organic phase containing titanium and sulfuric acid is obtained (OP);

then, a regeneration step in which the organic phase (OP) is regenerated by contact with an aqueous regeneration phase ($ARP_0$), by means of which a regenerated aqueous phase ($RAP_f$) containing titanium is obtained;

characterized in that it includes an additional step in which all or part of the regenerated aqueous phase ($RAP_f$) is placed in contact with an organic washing phase (OWP), by means of which a treated aqueous phase (TAP) containing titanium is obtained.

The invention also concerns a second embodiment of a process for treating a starting aqueous phase (SAP) containing titanium and sulfuric acid produced by the attack of sulfuric acid on titaniferous ores of the type in which the following steps are used:

an extraction step in which the starting aqueous phase (SAP) is placed in contact with an organic extraction phase (OEP) containing one or a plurality of organophosphorus compounds, by means of which an organic phase is obtained containing titanium and sulfuric acid (OP).

a regeneration step implemented by liquid-liquid countercurrent extraction over a plurality of stages in a suitable apparatus including an initial stage in which the organic phase (OP) is introduced flowing counter to an aqueous regeneration phase ($ARP_0$) introduced in the last stage of the apparatus, characterized in that an organic washing phase (OWP), containing the same organophosphorus compound(s) as the organic extraction phase (OEP) flowing counter to the aqueous regeneration phase ($ARP_0$), is introduced into one or a plurality of intermediate stages flowing counter to the aqueous regeneration phase ($ARP_0$).

The invention also concerns a third embodiment for treating a starting aqueous phase (SAP) containing titanium and sulfuric acid produced by the attack of sulfuric acid on titaniferous ores of the type in which the following steps are used:

an extraction step in which the starting aqueous phase (SAP) is placed in contact with ane organic extraction phase (OEP) containing one or a plurality of organophosphorus compounds, by means of which an organic phase containing titanium and sulfuric acid (OP) is obtained.

a liquid-liquid countercurrent extraction regeneration step is used over a plurality of stages in a suitable apparatus containing a first stage in which the organic phase (OP) is introduced flowing counter to an aqueous regeneration phase ($ARP_0$) introduced in the last stage of the battery, characterized in that, in an intermediate stage (n) a partially regenerated aqueous phase (PRAP) is extracted, placed in contact with an organic washing phase (OWP), by means of which a partially regenerated aqueous phase (PRAP$_f$), which is reintroduced at stage (n−1) of the regeneration step, is obtained.

The invention also concerns the titanium solution obtained by means of the process defined above.

Lastly, the invention concerns the process for preparing titanium dioxide in which the titanium solution is hydrolyzed, then the hydrolysate obtained is washed and calcined.

DESCRIPTION OF THE INVENTION

Other advantages of the invention will appear during reading of the more detailed description.

DETAILED DESCRIPTION OF THE INVENTION

Figure 1:
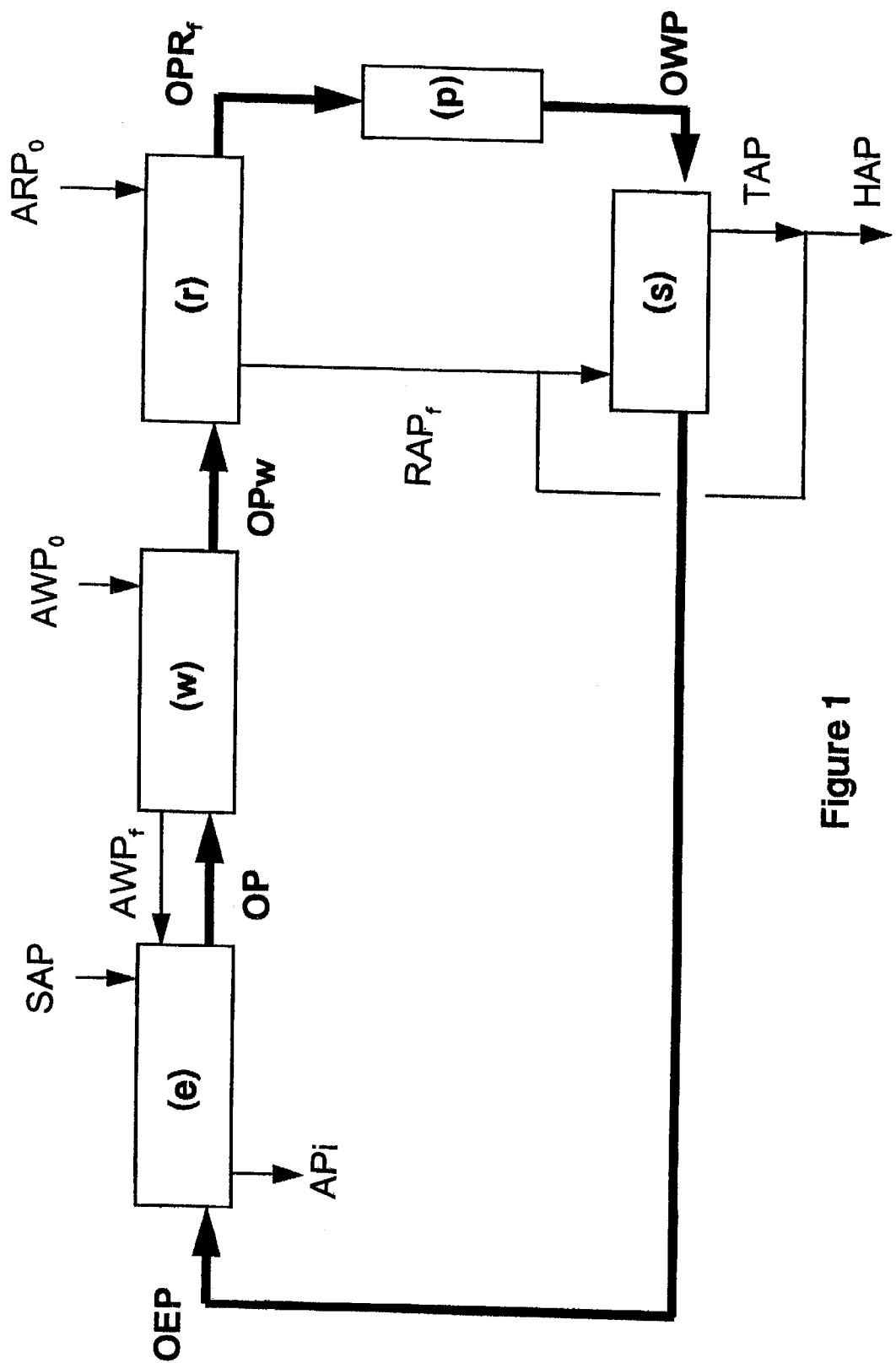
FIG. 1 shows the first embodiment of the treatment process.

To start with, the invention concerns a first embodiment of a treatment process for an aqueous phase containing titanium and sulfuric acid (SAP) produced by the contact of titaniferous ores and sulfuric acid of the type in which the following steps are used:

an extraction step in which the starting aqueous phase (SAP) is placed in contact with an organic extraction phase (OEP) containing one or a plurality of organophosphorus compounds, by means of which an organic phase is obtained containing titanium and sulfuric acid (OP), then, a regeneration step in which the organic phase is regenerated by bringing it in contact with an aqueous regeneration phase (ARP$_0$), by means of which a regenerated aqueous phase (RAP$_f$) containing titanium is obtained, characterized in that it contains an additional step in which all or part of the regenerated aqueous phase (RAP$_f$) is placed in contact with an organic washing phase (OWP), by means of which a treated aqueous phase (TAP) containing titanium is obtained.

The term titanium refers to all forms of titanium in an aqueous or sulfuric medium, in titanium sulfate form among others, as well as all forms of titanium in an organic medium including organic compounds, in titanium sulfate complexed by the organic compounds, for example.

The process according to the invention consists of treating a solution containing titanium and sulfuric acid called the starting aqueous phase (SAP). Such a starting phase originates in general produced by placing titaniferous ores (ilmenite, titaniferous slag) in contact with concentrated sulfuric acid. After contact, the insoluble part of the ore is separated from the ores in the liquid phase. This liquid phase is an aqueous solution of titanium sulfate containing sulfuric acid rich in foreign metal salts. This is commonly called black liquor.

According to the invention, the starting aqueous phase (SAP) initially undergoes an extraction step by being placed in contact with an organic phase called the organic extraction phase (OEP). During this step, the titanium from the starting aqueous phase (SAP) is extracted in the organic phase while the impurities, that is, the foreign metal salts, are maintained in the aqueous phase. At the end of this extraction step, an organic phase containing titanium and sulfuric acid (OP) is thus obtained, with the titanium purified.

Secondly, the organic phase containing the titanium and the sulfuric acid (OP) obtained undergoes a regeneration step by placement in contact with an aqueous regeneration phase (ARP$_0$). During this step, the titanium present in the organic phase is de-extracted into the aqueous phase. At the end of this regeneration step, a regenerated aqueous phase (RAP$_f$) containing titanium and sulfuric acid is thus obtained.

According to the first embodiment of the process according to the invention, the process contains an additional step during which all or part of the regenerated aqueous phase (RAP$_f$) is placed in contact with an organic washing phase (OWP).

The effect of this contact in the additional step is a lowering of the acid factor in the regenerated aqueous phase containing the purified titanium (RAP$_f$). In fact, after contact with the regenerated aqueous phase (RAP$_f$) and the organic washing phase (OWP) is complete, a treated aqueous phase (TAP), containing purified titanium and sulfuric acid with a controlled acid factor, is obtained directly. This aqueous phase may be directly hydrolyzed.

To implement the additional step, it is possible to treat the entire regenerated aqueous phase (RAP$_f$) or to treat only a fraction of it.

The invention also concerns a second embodiment of a treatment process for a starting aqueous phase (SAP) containing titanium and sulfuric acid produced by the attack of sulfuric acid on titaniferous ores of the type in which the following steps are used:

an extraction step in which the starting aqueous phase (SAP) is placed in contact with an organic extraction phase (OEP) containing one or a plurality of organophosphoms compounds, by means of which an organic phase containing titanium and sulfuric acid (OP) is obtained.

a regeneration step implemented by liquid-liquid countercurrent extraction over a plurality of stages in a suitable apparatus containing a first stage in which the organic phase (OP) is introduced flowing counter to an aqueous regeneration phase (ARP$_0$) introduced at the last stage of the apparatus, characterized in that an organic washing phase (OWP) is introduced during one or a plurality of intermediate stages containing the same organophosphorus compound(s) as the organic extraction phase (OEP) flowing counter to the aqueous regeneration phase (ARP$_0$).

This second method consists of implementing an initial extraction step such as the one described for the first embodiment.

Next, the organic phase containing titanium and sulfuric acid (OP) obtained undergoes a regeneration step through contact with an aqueous regeneration phase (ARP$_0$). This step is implemented by liquid-liquid extraction over a plurality of stages. The organic phase (OP) is introduced in the first stage of the apparatus and the aqueous regeneration phase is introduced flowing counter to the last stage. During this step, the titanium present in the organic phase is de-extracted into the aqueous phase. At the same time, in one or a plurality of the intermediate phases of the regeneration step, the organic washing phase (OWP) is introduced in the direction flow of the organic phase (OP). This makes it possible to lower the acid factor of the aqueous phase present in this or these stage(s) of the regeneration step. At the conclusion of the regeneration step, a treated aqueous phase (TAP) is obtained containing titanium and sulfuric acid and having a controlled acid factor.

The invention also concerns a third embodiment of a process for treating a starting aqueous phase (SAP) containing titanium and sulfuric produced by the attack of sulfuric acid on titaniferous ores of the type in which the following steps are used:

an extraction step in which the starting aqueous phase (SAP) is placed in contact with an organic extraction phase (OEP) containing one or a plurality of organophosphorus compounds, by means of which an organic phase containing titanium and sulfuric acid (OP) is obtained;

a regeneration step implemented by liquid-liquid countercurrent extraction over a plurality of stages in a suitable apparatus containing a first stage in which the organic phase (OP) is introduced flowing counter to an aqueous regeneration phase ($ARP_0$,) introduced in the last stage of the apparatus, characterized in that during an intermediate stage (n−1) a partially regenerated aqueous phase (PRAP) is extracted and placed in contact with an organic washing phase (OWP) by means of which an aqueous phase ($PRAP_f$) is obtained which is reintroduced at stage (n−1) of the regeneration step.

This third embodiment consists of implementing a first extraction step as described for the first and second embodiments.

Next, the organic phase containing the titanium and sulfuric acid (OP) obtained undergoes a regeneration step through contact with an aqueous regeneration phase ($ARP_0$). This step is implemented by liquid-liquid extraction over a plurality of stages. The organic phase (OP) is introduced in the first apparatus stage, and the aqueous regeneration phase is introduced in countercurrent in the last stage.

During this step, the titanium present in the organic phase is de-extracted into the aqueous phase. In intermediate stages (n) of this regeneration step, all or part of the aqueous phase is withdrawn from the apparatus, and the extract called partially regenerated aqueous phase (PRAP) is placed in contact with an organic washing phase (OWP). This contact permits the acid factor in the partially regenerated aqueous phase (PRAP) to be lowered. Following this contact, the aqueous phase obtained ($PRAP_f$) is reintroduced into the apparatus of the regeneration step in stage (n−1) flowing counter to the organic phase (OP).

It is also possible to perform this treatment of a partially regenerated aqueous phase (PRAP) produced by an intermediate stage (n) at a plurality of stages in the regeneration step.

In the last stage of the regeneration step, a treated aqueous phase (TAP) is collected containing purified titanium and sulfuric acid, and the acid factor is adapted to direct treatment by hydrolysis.

According to the first embodiment of the invention, during the additional step, the flow rate ratio (O/A) of the organic washing phase (OWP) to the regenerated aqueous phase ($RAP_f$) may be between 0.1 and 100, preferably between 1 and 60.

According to the first embodiment, introducing the organic washing phase (OWP) in the additional step helps lower the acid factor of the regenerated aqueous solution ($RAP_f$). More specifically, affecting the flow rate ratio of the aqueous phase ($RAP_f$) and organic phase (OP), it becomes possible to set the desired value of the final aqueous solution produced by the additional or regeneration step. Given the value of the acid factor ($FA_0$) of the regenerated aqueous phase ($RAP_f$) and the final acid value desired ($FA_f$), it is possible to obtain the desired result by a simple adjustment of the flow rate ratio (O/A) of the organic washing phase (OWP) to the regenerated aqueous phase ($RAP_f$). Generally speaking, the O/A ratio must be as high as the $FA_0$ and you want to have a low $FA_f$. For example, for a regenerated aqueous phase ($RAP_f$) with a $TiO_2$ concentration of 260 g/l and an $FA_0$ of 2.1, if the desired $FA_f$ is 1.7 at most, the O/A ratio must be at least 2.

The person skilled in the art may thus determine the O/A ratio value for each embodiment of the process.

Similarly, according to the second embodiment, the (O/A) ratio of the organic washing phase (OWP) to the aqueous regeneration phase ($ARP_0$) flow rate may go as high as 100, preferably 60, during the regeneration step.

And according to the third embodiment, the (O/A) ratio of the flow of the organic washing phase (OWP) to the partially regenerated aqueous phase (PRAP) may fall between 0.1 and 100, preferably between 1 and 60, during the regeneration step.

According to the three embodiments of the invention, the organic extraction phase (OEP) preferably contains one or a plurality of organophosphorus compounds of the general formula:

$$R_m(R'O)nP=O \qquad (I)$$

where:

R represents a straight or branched alkyl group,

R' represents an R group or a possibly substituted aryl group,

R and/or R' possibly containing one or a plurality of heteroatoms such as an oxygen atom, a halogen and/or a phosphorous atom, m is an integer from 1 to 3 and n is equal to 0, 1 or 2 with m+n equal to 3, all the R and R' substituents contain at least 12 carbon atoms in all.

The organophosphorus compounds of general formula (1) may be phosphonates such as dibutylbutyl phosphonate (DBBP), bis-(ethyl-2hexyl)(ethyl-2hexyl)phosphonate (DHEHP), tetraethyldecilene diphosphonate: $(C_2H_5O)_2$—OP—$CH_2$—$(CH_2)_8$—$CH_2$—$PO(OC_2H_5)_2$, dipentylpentyl phosphonate (DPPP), tetraethylbutylene diphosphonate: $(iC_3H_7O)_2OP$—$CH(CH_3)$—$PO(iC_3H_7)$, diethyldodecyl phosphonate, and the product sold under the trademark Baysolvex® VPAC 4046 DBBP. Dibutylbutyl phosphonate (DBBP) or dipentylpentyl-phosphonate (DPPP) are preferred.

They may also be such phosphinates as dioctylmethylphosphinate and products sold under the trademark Baysolvex® DMPL and NMPL.

These compounds may also be such phosphine oxides as di-n-hexylmethoxyoctyl phosphine (DHMOPO), tri-n-butyl-phosphine (TBPO, trioctylphosphine (TOPO), and products sold under the trademarks Cyanex® 923 and 925 and Hostarex® PX320.

Advantageously, the organic extraction phase (OEP) contains alkylphosphonates, possibly saturated in water, preferably dibutylbutyl phosphonate (DBBP) or dipentylpentyl phosphonate (DPPP), possibly saturated in water. Even more preferably, the organic extraction phase (OEP) contains dibutylbutyl phosphonate (DBBP), possibly saturated in water.

The organophosphorus compounds may be used pure or diluted.

Thus, the organic phases containing organophosphorus compounds may include a phosphorus organic compound chosen from among aromatic or aliphatic hydrocarbons, ethers, halogenate solvents, ketones, alkyl phosphates and mixtures thereof, in all proportions. In fact, specifically because of their physical properties, some organophosphorus compounds may not be used in their pure state for liquid-liquid extraction separation. In such a case, in addition to its solubilizing action, the diluent has a favorable effect on the physical properties of the organophosphorus compound(s) by, for example, decreasing the viscosity or density of the organic phase.

If the organophosphorus compound(s) are diluted, the concentration of the organophosphorus compound(s) in the diluent is at least approximately 10 wt.-%. This concentration is primarily a function of the physical properties desired for the organic phase.

The nature of the organic washing phase (OWP) may be varied.

According to the first and third embodiments, preferably, the organic washing phase (OWP) as well contains one or a plurality of organophosphorus compounds of formula (1). Even more preferably, the organic extraction phase (OEP) and the organic washing phase (OWP) have the same organic composition. The implementation of the first embodiment of the process has the advantage of using only a single type of organic phase and of operating with a single solvent circuit for the extraction step, the regeneration step, and the acid factor reduction step.

Advantageously, the organic extraction (OEP) and washing (OWP) phases have the same nature such that all or part of the organic phase from the acid factor reduction step may be mixed with the organic extraction phase (OEP) at the beginning of the process.

However, in the acid factor reduction step in the first and third embodiments, it is also possible for the organic washing phase (OWP) to use an organic solvent different from that of the organic extraction phase (OEP). Consequently, any organic solvent that permits selectively extracting the sulfuric acid from a titanium sulfate solution may be used, a water-immiscible alcohol, for example.

For the second embodiment, the organic washing phase (OWP) advantageously has the same nature as the organic extraction phase (OEP).

For the three embodiments, the organic phase from the acid factor reduction phase or the regeneration step is customarily reprocessed.

This reprocessing is designed to eliminate possible traces of sulfuric acid and solvent degradation products. This may be accomplished by placing the organic phase from the additional or regeneration step in contact with an aqueous reprocessing solution from the organic phase in order to de-extract all or part of these traces.

In the latter case, it is then possible to use the organic phase from this reprocessing as all or part of the organic extraction phase (OEP) or as all or part of the organic washing phase (OWP).

In general, the different steps of the process according to the invention are implemented by countercurrent extraction over a plurality of stages in suitable apparatuses such as mixer-decanter batteries or columns.

According to a variant of the process, all or part of the organic phase from the additional step or the regeneration step may be introduced into the apparatus stages of the extraction step.

According to another variant of the process according to the invention, before the regeneration step, the organic phase containing the titanium (OP) may undergo an intermediate washing with water and/or an aqueous solution containing sulfuric acid and/or titanium sulfate. The organic phase (OP) is then placed in contact with an aqueous washing phase (AWP$_O$) containing water and/or an aqueous solution containing sulfuric acid and/or titanium sulfate to eliminate the traces of impurities present in the organic phase (OP) that may have been extracted in the organic phase during the extraction step. This washing step may be implemented in conventional extraction apparatuses such as mixer-decanter batteries or columns.

This washing yields an aqueous phase from the washing step (AWP$_f$) containing impurities and a washed organic phase (OPw) containing titanium and sulfuric acid free of impurities is obtained. This washed organic phase (OPw) then undergoes the next step in the process according to the invention, i.e., the regeneration step.

According to yet another variant, the aqueous regeneration phase (ARP$_O$) may include sulfuric acid.

And finally, according to a last variant, the organic extraction phase (OEP) may be placed in contact with sulfuric acid before and/or during the extraction step, following the teaching of patent EP-A-207 403, for example.

These variants may be combined.

The invention also concerns the titanium solution obtained by the preceding process.

And finally, the invention concerns a process for preparation of titanium dioxide in which the titanium solution defined above is hydrolyzed; the hydrolysate obtained is then washed and calcined. In fact, the treatment process previously described enables obtaining readily hydrolyzable purified titanium sulfate solutions with a low acid factor. Hydrolysis of these solutions, followed by washing and calcining of the hydrolysate obtained, enables obtaining high quality pigmentary titanium dioxide.

Other characteristics of the process according to the invention will appear upon reading the following examples and the attached figures.

The references in the figures have the following meanings:
(e) countercurrent apparatus for extracting titanium sulfate
(w) countercurrent apparatus for washing the titanium sulfate organic phase
(r) countercurrent apparatus for regeneration of the titanium sulfate purified aqueous phase
(s) countercurrent apparatus for the acid factor control step
(p) countercurrent apparatus for reprocessing the organic phase from the regeneration step
(SAP) Starting aqueous phase containing titanium and sulfuric acid
(OEP) Organic extraction phase
(OP) Organic phase containing titanium and sulfuric acid
(APi) Aqueous phase containing impurities
(AWP$_O$) Aqueous washing phase
(AWP$_f$) Aqueous phase from the washing step
(OPw) Washed organic phase
(ARP$_O$) Aqueous regeneration phase
(RAP$_f$) Regenerated aqueous phase
(PRAP) Partially regenerated aqueous phase
(PRAP$_f$) Partially regenerated aqueous phase from the acid factor control step
(OPR$_f$) Organic phase from the regeneration step
(OWP) Organic washing phase
(TAP) Treated aqueous phase
(HAP) Hydrolyzable aqueous phase Heavy lines correspond to the organic phase circuit; light lines, the aqueous phase circuit.

Before detailing the various operations, it should be noted that the choice of the terms inlet and outlet of the extraction, washing, regeneration, treatment and additional units are based on the circulation direction of the organic phase.

FIG. 1 depicts a first embodiment the process according to the invention, with a washing step in the organic phase (OP).

The starting aqueous phase (SAP) is introduced into the apparatus (e) flowing counter to the organic extraction phase (OEP). Titanium is extracted into the organic phase, while the impurities are for the most part retained in the aqueous phase. Thus, at the outlet of (e), the organic phase containing titanium (OP) and the aqueous phase containing impurities (APi) are obtained.

This organic phase (OP) is introduced into the apparatus (w) flowing counter to the aqueous washing phase ($AWP_0$). A washed organic phase (OPw) and an aqueous phase from the washing stage ($AWP_0$) are thus obtained.

The washed organic phase (OPw) is introduced into apparatus (r) flowing counter to the aqueous regeneration phase ($ARP_0$), by means of which the titanium is de-extracted into the aqueous phase. A regenerated aqueous phase ($RAP_f$) containing titanium and an organic phase from the regeneration ($OPR_f$) are obtained.

The organic phase from the regeneration step is reprocessed in a reprocessing unit (p) to remove impurities. A purified organic phase is obtained which is used as the organic washing phase (OWP).

This organic washing phase (OWP) is introduced into apparatus (s) flowing counter to all or part of the regenerated aqueous phase ($RAP_f$) containing the titanium. A treated aqueous phase (TAP), containing the titanium and having a lower acid factor than the regenerated aqueous phase ($RAP_f$), is obtained; an organic aqueous phase is also obtained which is used as the organic extraction phase (OEP) at the beginning of the process. The treated aqueous phase (TAP) is possibly mixed with the regenerated aqueous step ($RAP_f$) not treated by the additional step, which results in a hydrolyzable aqueous phase (HAP).

The organic phase from the additional step is recycled at the beginning of the process as the organic extraction phase (OEP).

Figure 2:
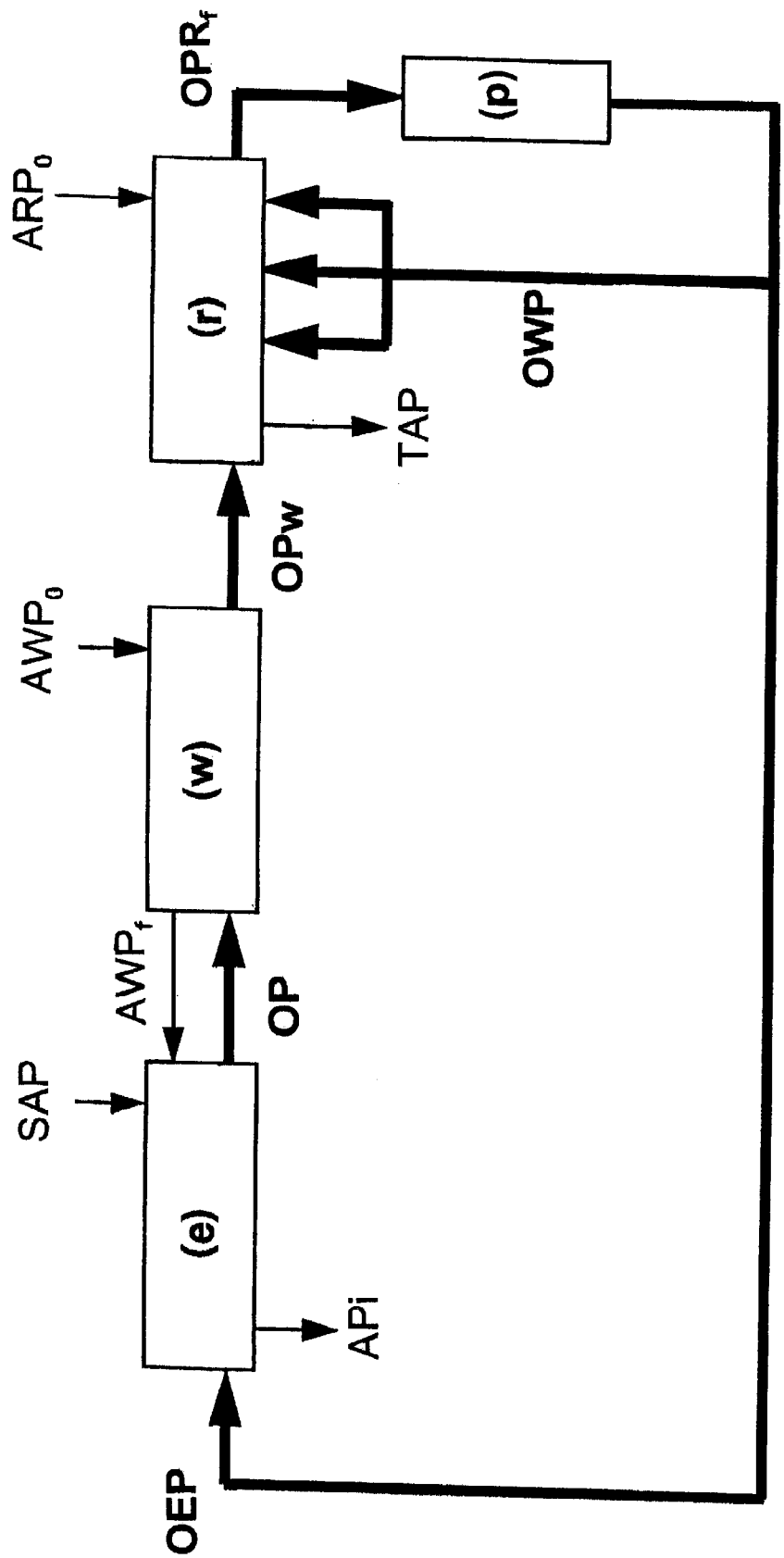
FIG. 2 shows the second embodiment of the treatment process.

FIG. 2 depicts the second embodiment of the process according to the invention, with a washing step in for organic phase (OP).

The starting aqueous phase (SAP) is introduced into the apparatus (e) flowing counter to the organic extraction phase (OEP). The titanium is extracted into the organic phase, while impurities are for the most part retained in the aqueous phase. At the outlet of (e), the organic phase with titanium (OP) and the aqueous phase containing impurities (APi) are thus obtained.

This organic phase (OP) is introduced into the apparatus (w) flowing counter to the aqueous washing phase ($AWP_0$). A washed organic phase (OPw) and an aqueous phase from the washing step ($AWP_f$) are obtained.

The washed organic phase (OPw) is introduced into the apparatus (r) flowing counter to the aqueous regeneration phase ($ARP_0$) by means of which titanium is de-extracted into the aqueous phase. In one or a plurality of stages of this regeneration unit, an aqueous washing phase (OWP) is introduced. At the outlet, an organic phase from the regeneration step ($OPR_f$) and a treated aqueous phase (TAP) containing the titanium with a controlled acid factor are obtained.

The organic phase from the regeneration step ($OPR_f$) is reprocessed in reprocessing unit (p) to remove impurities. A purified organic phase is obtained which is used as an organic extraction phase (OEP) and an organic washing phase (OWP).

Figure 3:
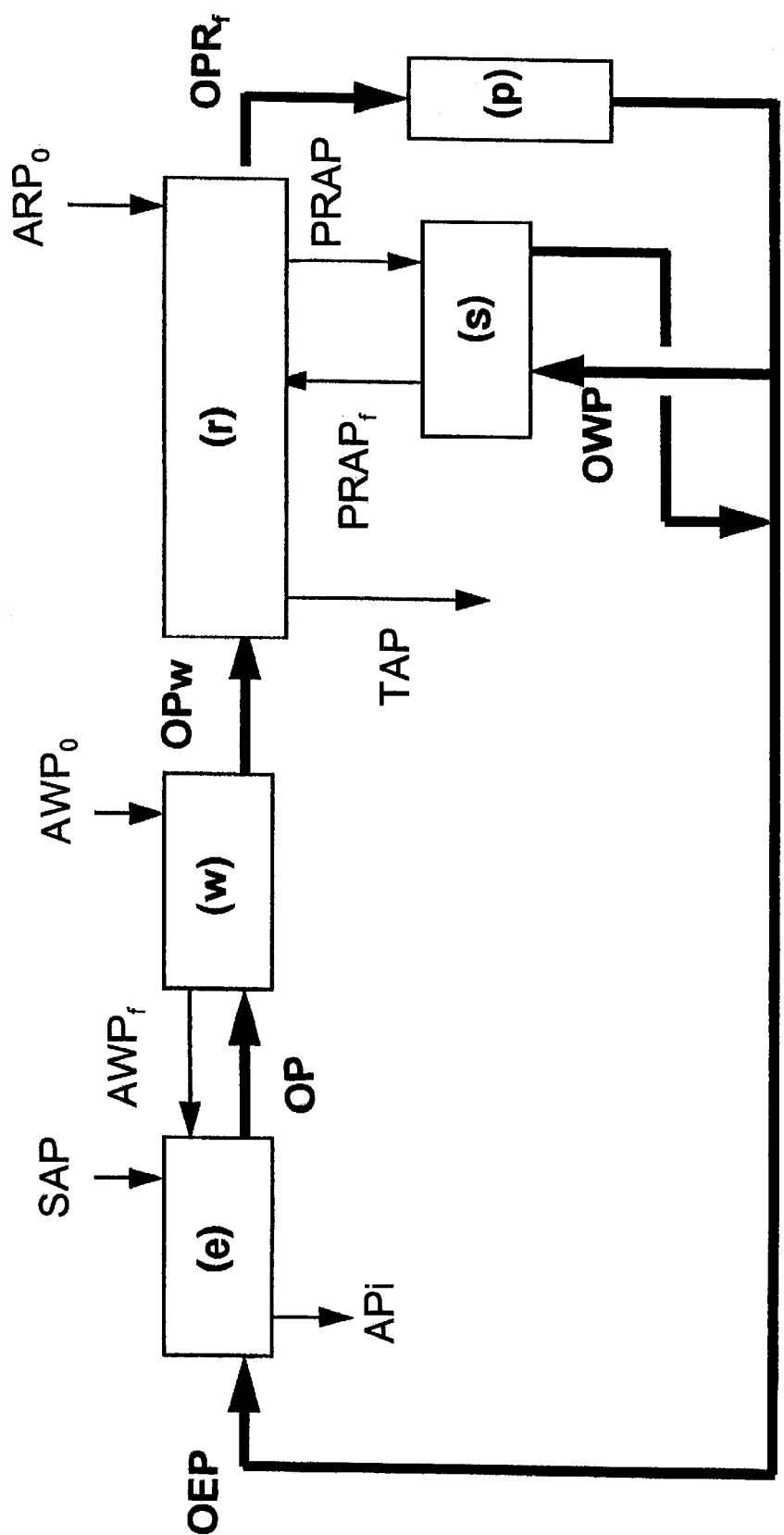
FIG. 3 shows third embodiment of the treatment process.

FIG. 3 depicts the third embodiment of the process according to the invention, with an washing step for the organic phase (OP).

The starting aqueous phase (SAP) is introduced into the apparatus (e) flowing counter to the organic extraction phase (OEP). The titanium is extracted into the organic phase, while impurities are for the most part retained in the aqueous phase. At the outlet of (e), the organic phase with titanium (OP) and the aqueous phase containing impurities (APi) are obtained.

This organic phase (OP) is introduced into the apparatus (w) flowing counter to the aqueous washing phase ($OWP_0$). A washed organic phase (OPw) and an aqueous phase from the washing step ($AWP_f$) are thus obtained.

The washed organic phase (OPw) is introduced into the apparatus (r) flowing counter to the aqueous regeneration phase ($ARP_0$) by means of which the titanium is de-extracted into the aqueous phase. In one of the intermediate stages (n) of this regeneration unit, all or part of the aqueous phase is removed: This is a partially regenerated aqueous phase (PRAP). This is placed in contact with an organic washing phase (OWP). After contact, an aqueous phase with a lower acid factor is obtained: ($PRAP_f$), which is reintroduced into the regeneration apparatus at stage (n−1).

At the outlet of the regeneration apparatus (r), a treated aqueous phase (TAP) containing purified titanium and having a controlled acid factor is obtained.

The organic phase from the regeneration step ($OPR_f$) is reprocessed in the reprocessing unit (p) to remove impurities. A purified organic phase is obtained which is used as an organic washing phase (OWP) and an organic extraction phase (OEP).

The organic phase from the step enabling reduction of the acid factor is mixed with the organic extraction phase (OEP).

EXAMPLES

The various contact steps are performed in conventional liquid-liquid countercurrent extraction systems. Such steps generally include a plurality of stages of mixer-decanter systems or columns packed and/or stirred, outfitted to perform the operations of extraction, washing, and de-extraction of components.

The equipment used includes the following elements:

an extraction section (e) containing 8 theoretical stages;

a washing section (w) containing 6 theoretical stages;

a regeneration section (r) containing 12 theoretical stages;

a reprocessing section (p) containing 4 theoretical stages;

a section enabling reduction of the acid factor (s) containing 1 theoretical stage.

Flow rates reported in the examples are those for which the entire separation process is in equilibrium.

Comparative Example 1
No Acid Factor Control

This example follows the embodiment illustrated in FIG. 1, but does not include the additional step.

The starting aqueous phase containing titanium and sulfuric acid (SAP) contains 221 g/l $TiO_2$ and 138 g/l $H_2SO_4$.

The organic phase used is composed of DBBP saturated in water (94/6 by weight).

The starting aqueous phase (SAP) is introduced in stage 8 of the section (e) with a flow rate of 3.03 l/h. The organic extraction phase (OEP) is introduced in countercurrent in stage 1 of the section (e) with a flow rate of 8.25 l/h.

Sulfuric acid concentrated to 98% is introduced in the stages of the section (e) with an overall flow rate of 440 ml/h.

The organic phase (OP) from stage 8 of the section (e) in stage 1 of the section (w) is introduced flowing counter to an aqueous washing phase containing part of the final purified titanium sulfate aqueous phase ($RAP_f$) introduced in stage 6 of this same the section (w), with the latter phase introduced at a flow rate of 960 ml/h. The aqueous phase collected in the first stage of this section (w) is introduced in stage 8 of the section (e).

The organic phase from stage 6 of the section (w) is introduced in stage 1 of the section (r) flowing counter to an aqueous phase containing water ($ARP_O$) introduced in stage 12 of this same section (r) with a flow rate of 2.55 l/h.

At stage 1 of the section (r), the regenerated aqueous phase ($RAP_f$) is collected; it has an acid factor of 2.33.

Example 2

This example follows the embodiment illustrated in FIG. 1.

The starting aqueous phase containing titanium and sulfuric acid (SAP) contains 226.5 g/l $TiO_2$ and 141.9 g/l $H_2SO_4$.

The organic phase used is composed of DBBP saturated in water (90/10 by weight).

The starting aqueous phase (SAP) is introduced in stage 8 of the section (e) with a flow rate of 4.55 l/h. The organic extraction phase (OEP) is introduced in countercurrent in stage 1 of the section (e) with a flow rate of 14.5 l/h.

Sulfuric acid concentrated to 98% is introduced in the stages of the section (e) with an overall flow rate of 695 ml/h.

The organic phase (OP) from stage 8 of the section (e) in stage 1 of the section (w) is introduced flowing counter to an aqueous washing phase containing part of the final purified titanium sulfate aqueous phase ($RAP_f$) introduced in stage 6 of this same section (w) with a flow rate of 1.45 l/h. The aqueous phase collected in the first stage of this section (w) is introduced in stage 8 of the section (e).

The organic phase from stage 6 of the section (w) is introduced in stage 1 of the section (r) flowing counter to an aqueous phase containing water ($ARP_O$) introduced in stage 12 of this same section (r) with a flow rate of 3.75 l/h.

In stage 1 of the section (r), the regenerated aqueous phase ($RAP_f$) is collected: it has an acid factor of 2.07. It is introduced in the section (s) with a flow rate of 2.4 l/h. DBBP (OWP) saturated in water (90/10) is also introduced in countercurrent in stage 1 of this same section (s) with a flow rate of 14 l/h. The O/A ratio is thus 5.96.

In stage 1 of the section (s), the treated aqueous phase (TAP), with a flow rate of 2.2 l/h, is collected. It has an acid factor of 1.25.

By mixing this treated aqueous phase (TAP) with part of the regenerated aqueous phase ($RAP_f$), a hydrolyzable solution of purified titanium sulfate with an acid factor of 1.73 and which yields good quality pigment is obtained.

What is claimed is:

1. A process for treating a starting aqueous phase of titanium and sulfuric acid comprising:
   a) extracting the starting aqueous phase with an organic extraction phase which comprises at least one organophosphorous compound to produce an organic phase having titanium and sulfuric acid;
   b) regenerating with an aqueous phase the organic phase to produce a regenerated aqueous phase which comprises titanium and sulfuric acid; and
   c) washing the regenerated aqueous phase with an organic washing phase to produce a washed aqueous phase having titanium and sulfuric acid.

2. A process for treating a starting aqueous phase of titanium and sulfuric acid comprising:
   a) extracting the starting aqueous phase with an organic extraction phase which comprises at least one organophosphorus compound to produce an organic phase having titanium and sulfuric acid;
   b) regenerating with an aqueous phase the titanium and sulfuric acid by multi-stage liquid-liquid countercurrent extraction wherein the countercurrent extraction comprises introducing the organic phase flowing counter to an aqueous regeneration phase and washing the aqueous regeneration phase with at least one intermediate stage of an organic washing phase comprising at least one organophosphorous compound used in the organic extraction phase to produce a washed aqueous phase having titanium and sulfuric acid.

3. A process for treating a starting aqueous phase of titanium and sulfuric acid comprising:
   a) extracting the starting aqueous phase with an organic extraction phase which comprises at least one organophosphorus compound to produce an organic phase having titanium and sulfuric acid;
   b) regenerating with an aqueous phase the titanium dioxide and sulfuric acid by a multi-stage liquid-liquid countercurrent extraction wherein the countercurrent extraction comprises introducing the organic phase flowing counter to an aqueous regeneration phase;
   c) washing a partially regenerated aqueous phase with an organic washing phase to produce a washed partially regenerated aqueous phase;
   d) reintroducing with the aqueous regeneration phase, the washed partially regenerated aqueous phase into the multi-stage liquid-liquid countercurrent extraction.

4. The process according to claim 1 wherein during the washing step, the flow rate ratio of the organic washing phase to the regenerated aqueous phase is between 0.1 and 100.

5. The process according to claim 2 wherein during the regenerating step, the flow rate ratio of the organic washing phase to the aqueous regenerated phase increases to 100.

6. The process according to claim 3 wherein during the washing step, the flow rate ratio of the organic washing phase to the partially regenerated aqueous phase is between 0.1 and 100.

7. The process according to any one of claims 1, 2, 3, 4, 5, or 6 wherein the organic extraction phase includes one or a plurality of organophosphorous compounds of the general formula:

$$R_m(R'O)nP=O \qquad (1)$$

where:
R represents a straight or branched alkyl group; R' represents an R group or a substituted aryl group; R comprises one or a plurality of heteroatoms; R' comprises one or a plurality of heteroatoms; m is an integer from 1 to 3 and n is equal to 0, 1 or 2 with m+n being equal to 3; and R' substituents contain at least 12 carbon atoms in all.

8. The process according to claim 7 wherein the organic washing phase comprises one or a plurality of organophosphorous compounds of formula (1).

9. The process according to claim 8 wherein the organic extraction phase and the organic washing phase have the same composition.

10. The process according to any one of claims 1, 2, 3, 4, 5, or 6 wherein the organic phase from the washing or the regenerating step is mixed with the organic extraction phase.

11. The process according to any one of claims 1, 2, 3, 4, 5, or 6 wherein the organic phase from the washing step or the regenerating step is reprocessed.

12. The process according to any one of claims 1, 2, 3, 4, 5, or 6 wherein different steps are implemented by counter-current extraction over a plurality of stages in mixer-decanter batteries.

13. The process according to claim 12, wherein all or part of the organic phase from the washing step or the regenerating step are introduced in the mixer-decanter battery stages of the extracting step.

14. The process according to any one of claims 1, 2, 3, 4, 5, or 6 wherein before the regenerating step, the organic phase undergoes an intermediate washing with water and/or an aqueous solution containing sulfuric acid and/or titanium sulfate.

15. The process according to any one of claims 1, 2, 3, 4, 5, or 6 wherein the aqueous regeneration phase contains sulfuric acid.

16. The process according to any one of claims 1, 2, 3, 4, 5, or 6 wherein the organic extraction phase is placed in contact with sulfuric acid before and/or during the extraction step.

17. The organophosphorous compound of claim 7 wherein R contains at least one heteroatom selected from the group consisting of an oxygen atom, a halogen and a phosphorous atom.

18. The organophosphorous compound of claim 7 wherein R' contains at least one heteroatom selected from the group consisting of an oxygen atom, a halogen and a phosphorous atom.

19. The process of claim 1 wherein the washed aqueous phase having titanium and sulfuric acid is recovered.

20. The process of claim 2 wherein the washed aqueous phase having titanium and sulfuric acid is recovered.

21. The process of claim 3 wherein the washed aqueous phase having titanium and sulfuric acid is recovered.

* * * * *